US009662848B2

(12) United States Patent
Richir et al.

(10) Patent No.: US 9,662,848 B2
(45) Date of Patent: May 30, 2017

(54) METHOD AND APPARATUS FOR ADJUSTING A TIRE BUILDING MACHINE

(71) Applicant: The Goodyear Tire & Rubber Company, Akron, OH (US)

(72) Inventors: André Marie Raymond Louis Christian Richir, Arlon (BE); Thierry Royer, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 378 days.

(21) Appl. No.: 14/609,997

(22) Filed: Jan. 30, 2015

(65) Prior Publication Data
US 2015/0144269 A1 May 28, 2015

Related U.S. Application Data

(62) Division of application No. 13/269,014, filed on Oct. 7, 2011, now Pat. No. 8,991,804.

(51) Int. Cl.
B23Q 3/00 (2006.01)
B29D 30/26 (2006.01)
B29D 30/00 (2006.01)
B29D 30/12 (2006.01)
B29D 30/24 (2006.01)
B29D 30/20 (2006.01)

(52) U.S. Cl.
CPC ......... B29D 30/26 (2013.01); B29D 30/0061 (2013.01); B29D 30/12 (2013.01); B29D 30/24 (2013.01); B29D 2030/202 (2013.01); Y10T 29/49998 (2015.01)

(58) Field of Classification Search
CPC ......... B25B 1/268; B25B 5/163; B23P 19/04; B23Q 1/03; B23Q 4/00
See application file for complete search history.

(56) References Cited

U.S. PATENT DOCUMENTS

| 3,276,930 A | 10/1966 | Keffe, Jr. |
| 3,607,555 A | 9/1971 | Leblond et al. |
| 3,713,929 A | 1/1973 | Bottasso et al. |
| 3,782,871 A | 1/1974 | Turk |
| 3,784,437 A | 1/1974 | Appleby et al. |
| 3,865,669 A | 2/1975 | Todd |
| 3,865,670 A | 2/1975 | Habert |
| 3,868,203 A | 2/1975 | Turk |
| 3,888,720 A | 6/1975 | Habert |
| 4,043,725 A | 8/1977 | Schmidt |
| 4,087,305 A | 5/1978 | Touchette et al. |
| 4,268,330 A | 5/1981 | Komatsu et al. |
| 4,279,856 A | 7/1981 | Vente et al. |
| 4,362,456 A | 12/1982 | Barry |

(Continued)

FOREIGN PATENT DOCUMENTS

EP 1295705 A2 9/2002
EP 1479509 B1 11/2004

Primary Examiner — Lee D Wilson
(74) Attorney, Agent, or Firm — Robert N. Lipcsik

(57) ABSTRACT

A method supports a tire building assembly. The method comprises the steps of: supporting one end portion of a radially collapsible building drum for assembling a green tire; moving the end portion in a first direction by an actuator acting in the first direction; and moving the end portion in a second direction by the actuator acting in the first direction.

10 Claims, 16 Drawing Sheets

(56) References Cited

U.S. PATENT DOCUMENTS

| | | | |
|---|---|---|---|
| 4,614,562 A | 9/1986 | Jones | |
| 5,201,975 A | 4/1993 | Holroyd et al. | |
| 5,248,357 A | 9/1993 | Miyanaga et al. | |
| 5,269,870 A | 12/1993 | Mori | |
| 5,290,376 A | 3/1994 | Siegenthaler | |
| 6,139,668 A | 10/2000 | Stokes et al. | |
| 6,235,135 B1 | 5/2001 | Sergel et al. | |
| 7,384,499 B2 | 6/2008 | Girard et al. | |
| 8,991,804 B2 * | 3/2015 | Christian Richir | B29D 30/0061 269/225 |
| 2004/0231779 A1 * | 11/2004 | Girard | B29D 30/0661 156/129 |
| 2007/0125497 A1 | 6/2007 | Lundell et al. | |
| 2010/0300603 A1 | 12/2010 | Marchini et al. | |
| 2013/0087962 A1 * | 4/2013 | Christian Richir | B29D 30/0061 269/56 |
| 2015/0144269 A1 * | 5/2015 | Richir | B29D 30/0061 156/414 |

* cited by examiner

METHOD AND APPARATUS FOR ADJUSTING A TIRE BUILDING MACHINE

FIELD OF THE INVENTION

The present invention relates to a method and an apparatus for moving a tire building drum.

BACKGROUND OF THE INVENTION

In the manufacture of pneumatic tires, elastomeric components, some of which are reinforced by cords of textile or wire, are formed as long strips. These strips are assembled together to form a carcass subassembly in a first stage of assembly. This carcass typically has one or more cord reinforced plies, a pair of bead cores and an air impervious liner. Additional strips of material such as apexes, shoulder gum strips, chippers, and chaffers may also be included in this first stage of tire assembly.

In a second stage, the tread rubber and belt or breaker reinforcing structure is typically applied to the carcass after the carcass has been toroidally shaped on the tire building drum. The tread rubber may be of one or more homogeneous compounds. Typically, the tread is a sophisticated composite of many different rubber materials co-extruded to form a tread strip. The belt or breaker reinforcing layers generally include two layers or more of cross plies reinforced by equal, but oppositely oriented, cords of textiles, such as nylon or aramid, or wire, such as steel. Additionally, overlays or underlays of generally circumferentially oriented cords may be added as additional layers.

Tires typically have been built using this two-stage assembly. Once assembled, this uncured assembly of the components may be placed in a curing mold to be vulcanized to form a finished tire. High speed and efficient ways to manufacture tires require the processes to be reliable and fast. Accordingly, manufacturers of tires have experimented and perfected many ways to improve on the basic two-stage assembly of tires.

An expansible and contractible transfer ring may convey a breaker/tread assembly from a tire building drum in a tire building machine to a tire carcass mounted on a tire shaping machine. A separate tread/breaker building drum may vary in size to accommodate different sizes of tires.

Thus, the assembly of a tread/belt to a tire carcass may be accomplished off-line, or separate from, the carcass building machine. Once formed into a ring, these tread/breaker assemblies may be moved to encircle a tire carcass, the carcass may be inflated to contact the inner surface of the tread/breaker assembly and stitched together by a roller mechanism to form a green, or uncured, tire assembly to be placed into a curing mold.

Conventional tire molds, whether two piece molds or segmented molds, form the tread surfaces by pressing groove forming ribs and sipe forming blades into the tread rubber as the tire is cured. As this is done, the belt cords, particularly those directly under the groove-forming ribs, may deflect in small, but noticeable, undulations. These undulations may create a variety of changes across the tread that actually may alter the surface or change the amount of tread rubber across the otherwise normal appearing tire. These non-uniformities may lead to mass imbalance issues, irregular wear, and a variety of associated ride/handling/noise performance issues. A goal in tire manufacturing is to minimize unpredictable non-uniformities in manufacturing while also building the tire in a very cost-efficient manner.

SUMMARY OF THE PRESENT INVENTION

A method in accordance with the present invention supports a tire building assembly.

The method comprises the steps of: supporting one end portion of a radially collapsible building drum for assembling a green tire; moving the end portion in a first direction by an actuator acting in the first direction; and moving the end portion in a second direction by the actuator acting in the first direction.

According to another aspect of the method, the first direction extends ninety degrees relative to the second direction in a horizontal plane.

According to still another aspect of the method, the method further includes the step of moving a longitudinal rail in the first direction.

According to yet another aspect of the method, the method further includes the step of moving a transverse rail in the second direction.

According to still another aspect of the method, the method further includes the step of pivotally securing a link to the actuator and the end portion.

According to yet another aspect of the method, the method further includes the step of positioning a spring about an actuating rod of the actuator.

According to still another aspect of the method, the method further includes the step of acting against movement of the end portion in the first direction by a spring.

According to yet another aspect of the method, the acting step further causes acting against movement of the end portion in the second direction.

According to still another aspect of the method, the method further includes the step of compressing a spring by the actuator.

According to yet another aspect of the method, the method further includes the step of sliding a rail in the second direction.

An assembly in accordance with the present invention moves an end portion of a tire building assembly. The assembly includes a support frame for supporting the end portion, a longitudinal rail slidingly mounted to the support frame, a transverse rail slidingly mounted to the longitudinal rail; and an actuator for moving the longitudinal rail in a first direction relative to the support frame. The actuator also moves the transverse rail in a second direction relative to the support frame and the longitudinal rail.

According to another aspect of the assembly, the first direction extends ninety degrees relative to the second direction.

According to still another aspect of the assembly, the assembly further includes a link pivotally secured to both the longitudinal rail and the transverse rail.

According to yet another aspect of the assembly, the actuator includes a cylinder, an actuating rod, and a spring acting against movement in the first direction.

According to still another aspect of the assembly, the assembly further includes a link for transferring a longitudinal force of the actuator into a transverse force acting at ninety degrees relative to the longitudinal force.

According to yet another aspect of the assembly, the assembly further includes a stop for limiting movement of the longitudinal rail in the first direction.

According to still another aspect of the assembly, the assembly further includes a first movement and a second movement acting subsequently to the first movement, the first movement producing motion in the first direction and the second movement producing motion in the second direction.

According to yet another aspect of the assembly, the assembly further includes a first position of a live center pin, a second position of the live center pin a first distance from the first position in the first direction, and a third position of the live center pin a second distance from the second position in the second direction.

According to still another aspect of the assembly, the assembly further includes a link pivotally secured about vertical axes to the actuator and the transverse rail.

According to yet another aspect of the assembly, the assembly further includes a link proving sequentially movement of the end portion in the first direction and then the second direction.

Definitions

"Apex" means an elastomeric filler located radially above the bead and interposed between the plies and the ply turnup.

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Breaker Structure" refers to at least two annular layers or plies of parallel reinforcement cords oppositely oriented having the same angle or about 5° less than the parallel reinforcing cords in carcass plies, generally about 20° to less than 50° with reference to the equatorial plan of the tire.

"Belt Structure" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the carcass, the belt reinforcement and other components of the tire excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement filaments, cables, or strands of which the plies in the tire are comprised.

"Equatorial plane (EP)" means the plane perpendicular to the tire's axis of rotation and passing through the center of its tread.

"Innerliner or liner" means the layer or layers of elastomer or other material that form the inside surface of a tubeless tire and that contain the inflating fluid within the tire.

"Overlay" means one or more layers of parallel cords underlying tread above the belt structure and having cord angles typically 0° to 15° with respect to the equatorial plane of the tire.

"Ply" means a continuous layer of rubber-coated parallel cords.

"Radial" and "radially" mean directions radially toward or away from the axis of rotation of the tire.

"Radial ply tire" means a belted or circumferentially-restricted pneumatic tire in which the ply cords which extend from bead to bead are laid at cord angles between 65°-90° with respect to the equatorial plane of the tire.

"Section height" means the radial distance from the nominal rim diameter to the outer diameter of the tire at its equatorial plane.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Shoulder gum strip" means an elastomeric reinforcement located in the shoulder region of the carcass.

"Sidewall" means that elastomeric portion of a tire between the tread and the bead.

"Subassembly" means an unvulcanized assembly of laminated unreinforced tire components to which a cord reinforced ply or plies and other tire components can be added to form a casing.

"Tread" means a rubber component which when bonded to a tire carcass includes that portion of the tire that come into contact with the road when the tire is normally inflated and under normal load.

"Tread width" means the arc length of the tread surface in the axial direction, that is, in a plane parallel to the axis of rotation of the tire.

"Underlay" means one or more layers of parallel cords underlying the belt structure or at least one layer of the belt structure and having cord angles typically 0° to 15° with respect to the equatorial plane of the tire.

BRIEF DESCRIPTION OF THE DRAWINGS

The present invention will be described, by way of example, and with reference to the accompanying drawings, in which.

DETAILED DESCRIPTION OF THE PRESENT INVENTION

Figure 1:
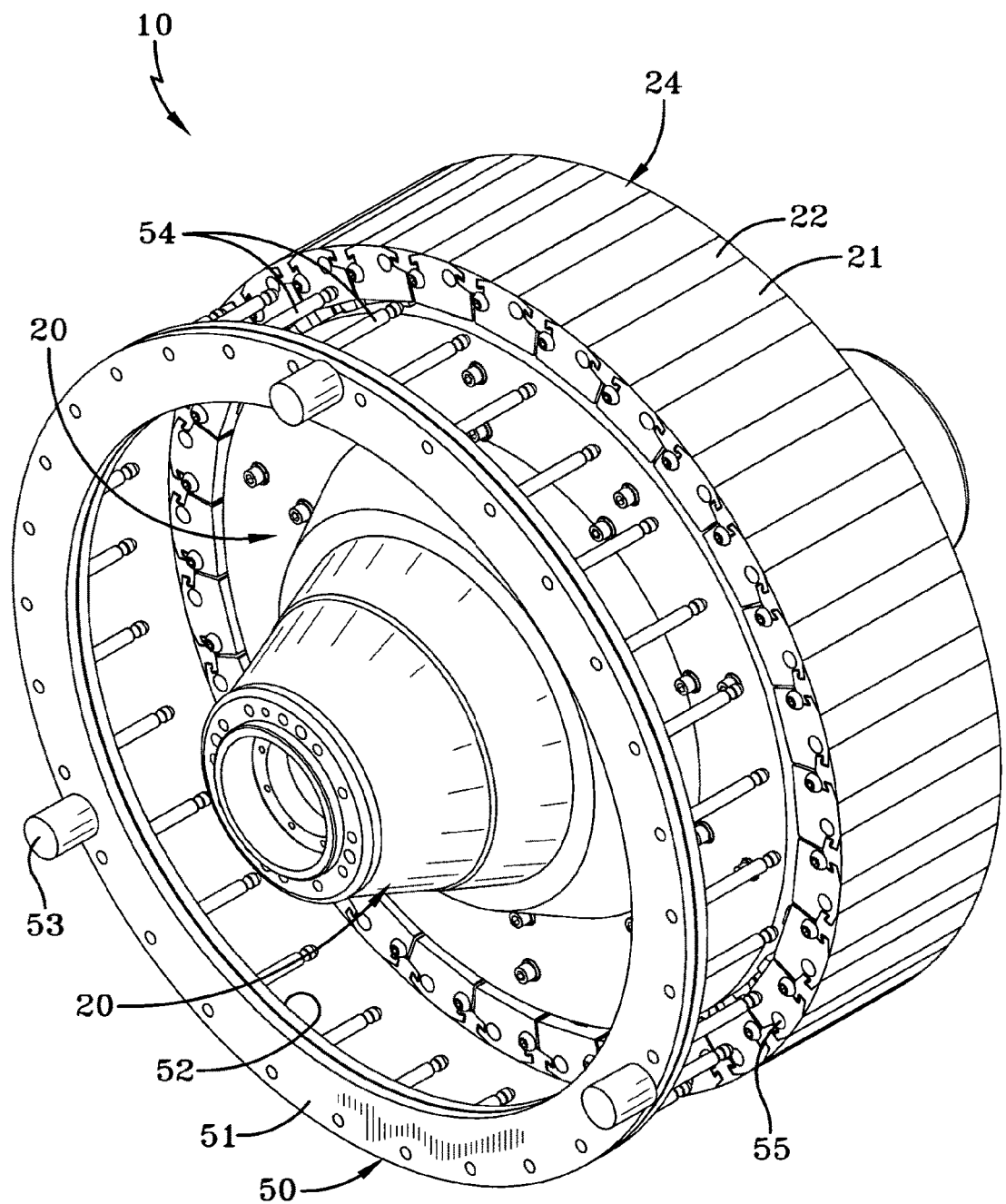
FIG. 1 is a perspective view of the tread or tread belt assembly building drum of the present invention.

With reference to FIG. 1, a perspective view of a tread or tread belt assembly building drum is illustrated. As shown, a building drum 10 has a radially expandable and contractible support means 20. The support means 20 has a radially outer surface 24 for building a tread or tread belt reinforcing structure onto the surface 24. The surface has a plurality of arcuate or straight segments 22 which are connected by gap spanner segments 21 around the peripheral surface of the tread building support means. The arcuate or straight segments 22 and gap spanner segments 21 are slidably attached onto the building drum support means 20. Each arcuate segment 22 has a hole or opening 55 for accepting a plurality of pins located on a transfer means 50. The pins 54 can be pressed into the openings 55 and provide a means 50 for transferring the arcuate or straight segments and gap spanner segments as an assembly onto and off the support means 20.

As used herein, each segment 22 and gap spanner segment 21 may have a flat or straight circumferentially or laterally extending surface or, alternatively, an arcuate surface. Hereinafter the segments will be generally referred to as arcuate while it is understood the surface may be straight in either the circumferential direction or the lateral direction.

As illustrated in FIG. 1, the transfer means 50 has an annular transfer ring 51 and a guide ring 52. The guide ring 52 is slidably inserted over the pins 54 and the pins 54 are rigidly attached to the transfer ring 51 as shown. On the exterior surface of the transfer means 50 are shown three knobs 53.

Figure 2:
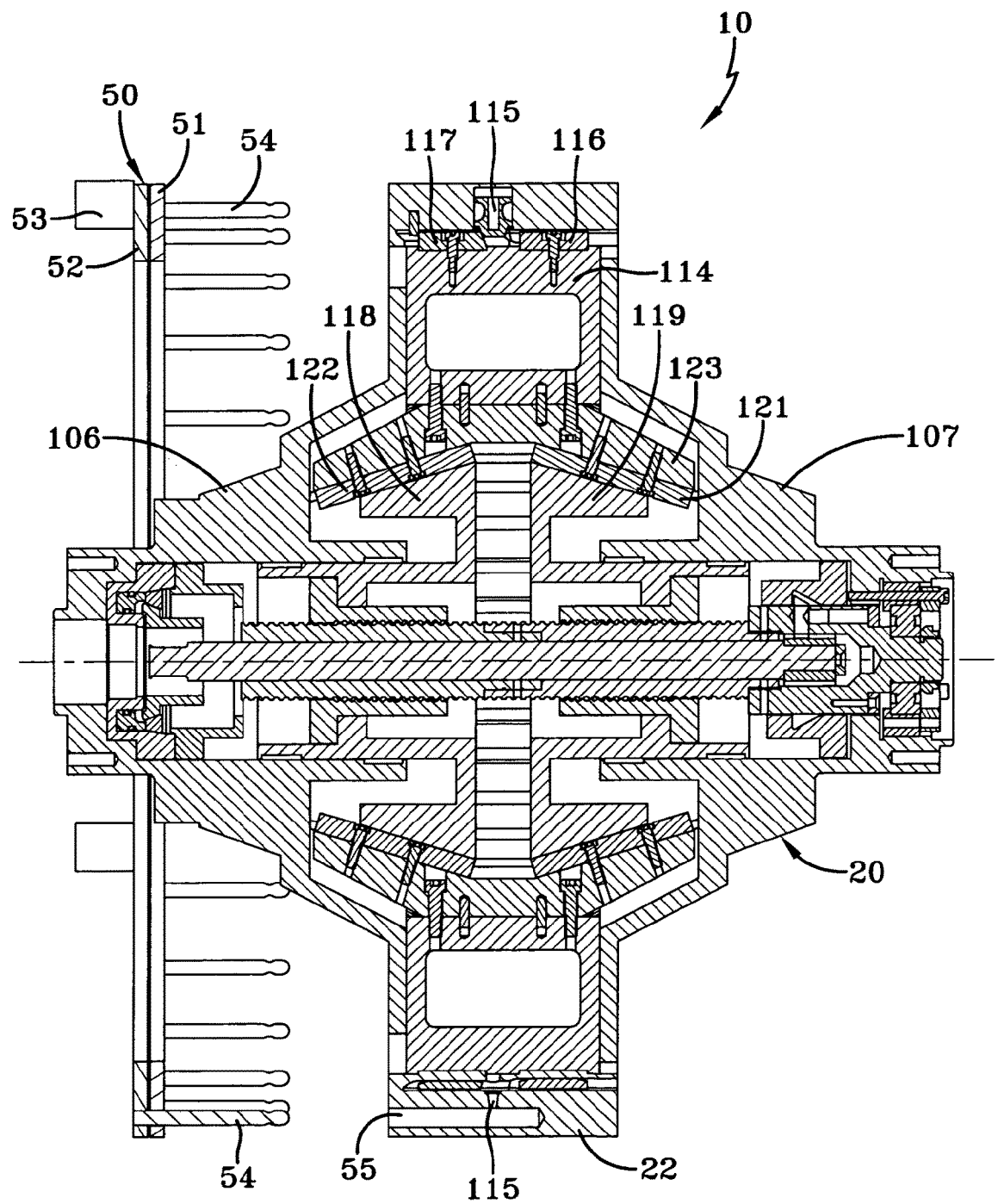
FIG. 2 is a cross-sectional view of the tread or tread belt assembly building drum of the present invention.
Figure 3:
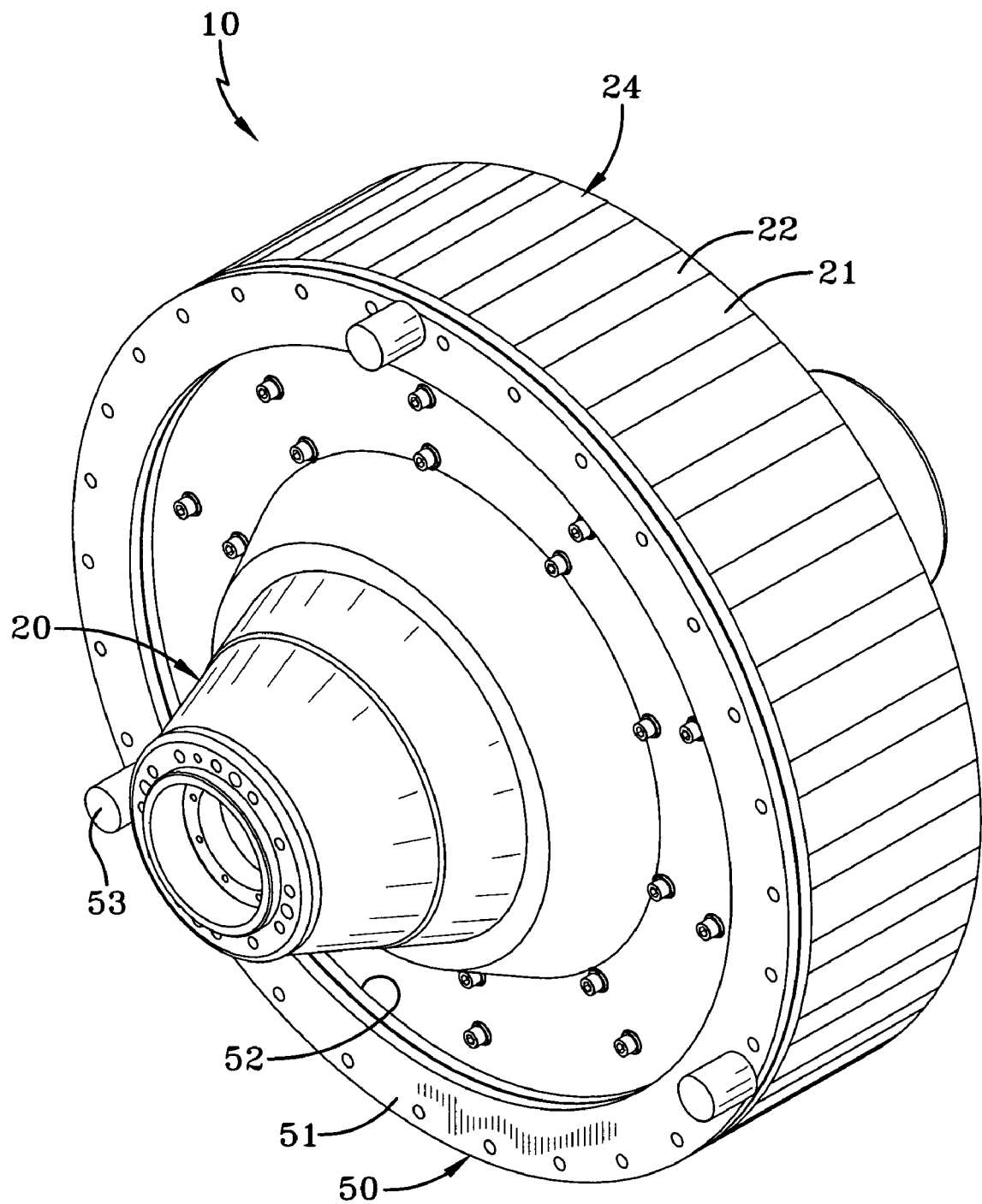
FIG. 3 is a perspective view of the transfer means engaged in the support means of the building drum.
Figure 4:
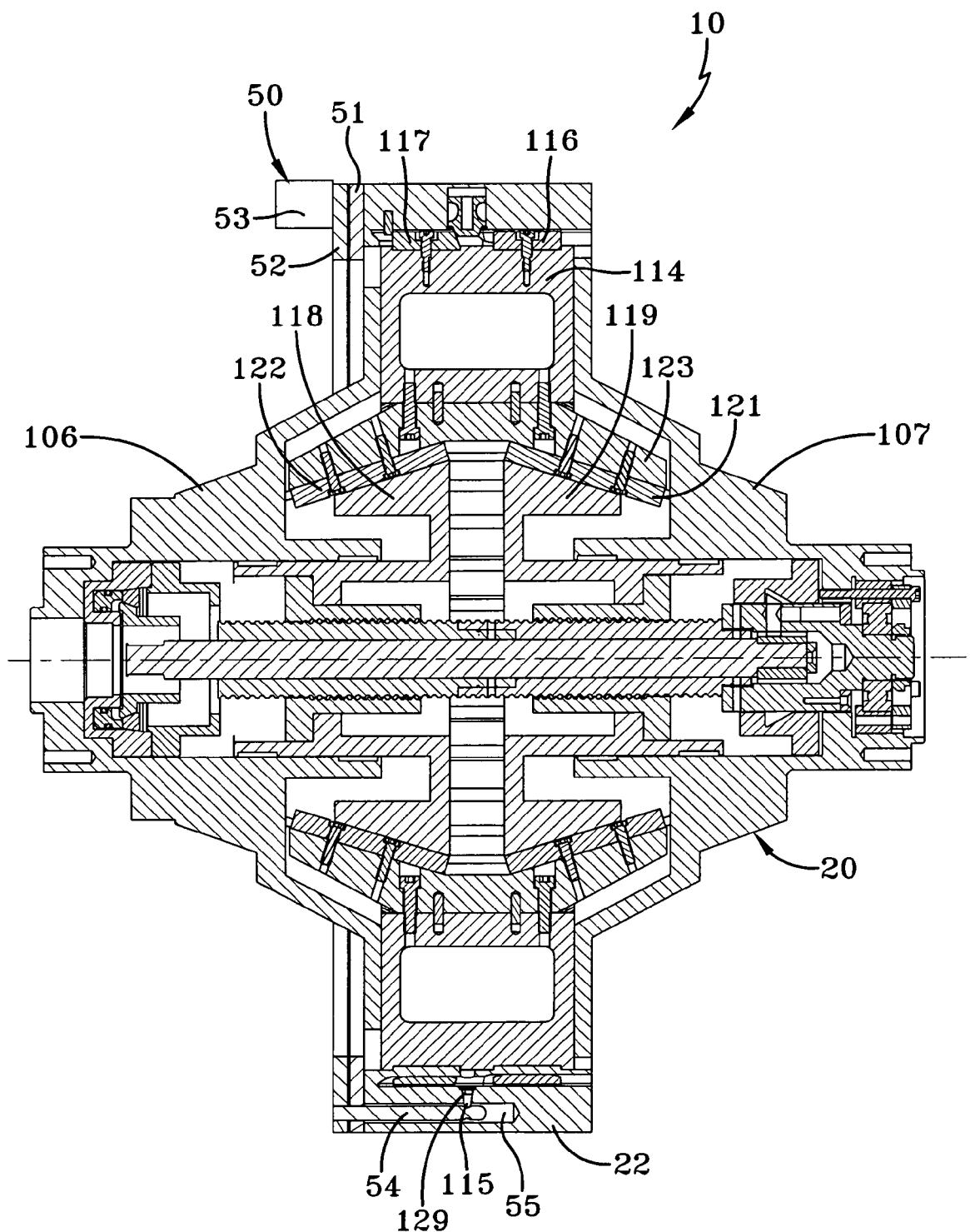
FIG. 4 is a cross-sectional view of the apparatus taken from FIG. 3.

With reference to FIG. 2, a cross sectional view of the building drum 10 is shown along with the transfer means 50. The transfer means 50 is shown not engaged to the building drum 10 or to the arcuate or straight segments 22. The combination of the arcuate or straight segments 22 and the gap spanner segments 21 form a subassembly commonly referred to as the deck. The term "deck" is commonly referred to with a similar meaning as that of the deck of a boat. It is an exterior surface upon which one may stand or build the tread assembly. Hereinafter the building surface 24 will be referred to as the deck 24. This deck 24, which is an assembly of the arcuate or straight segments 22 and the gap spanning segments 21, is slidably mounted over deck segment guides 116, 117. Once slid over these guides 116, 117, a detent assembly called a deck segment locking pin 115 engages and secures the deck 24 to the drum expansion segment 114. To remove the deck assembly 24 from the radially expandable and contractible tread building drum 10, the transfer means 50 is pushed into the holes 55 wherein the pins 54 engage the deck segment locking pins 115 thereby releasing them when the pins 54 are fully engaged (FIGS. 3 & 4).

Figure 5:
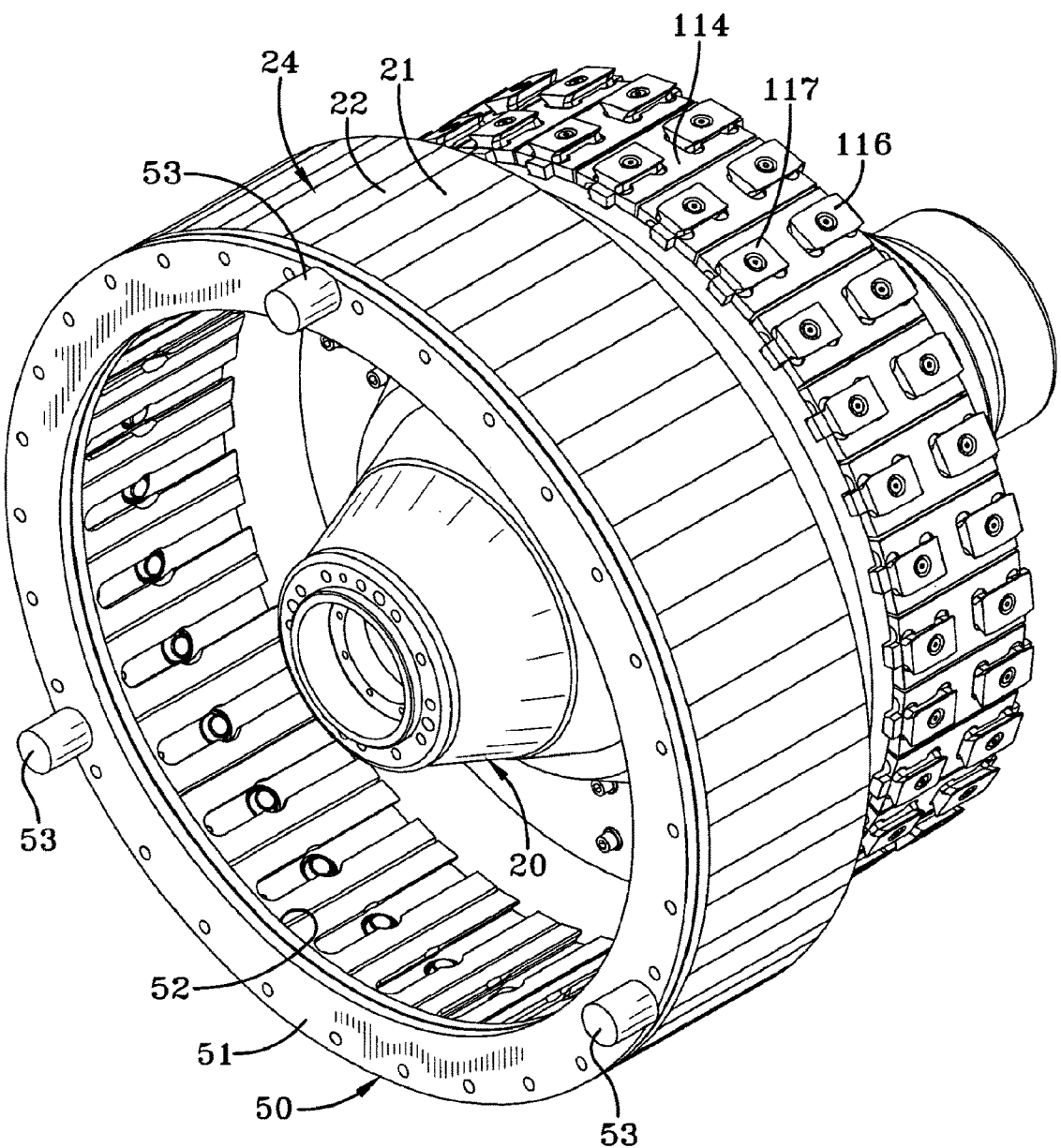
FIG. 5 is a perspective view showing the transfer means with the support means attached thereto and separated from the building drum.
Figure 6:
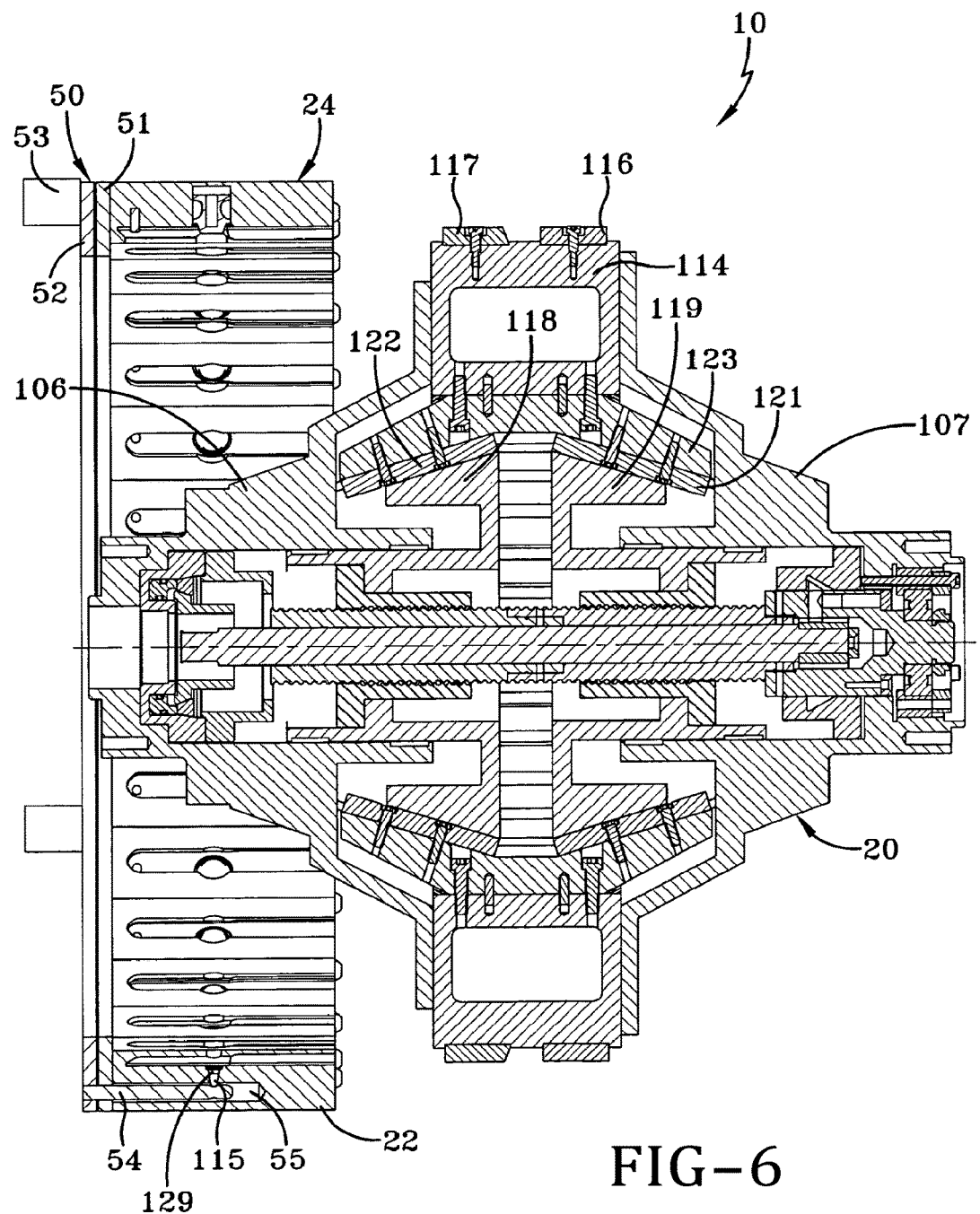
FIG. 6 is a cross sectional view of the apparatus taken from FIG. 5.

Once engaged, the transfer means 50 may be used to slidably remove the deck assembly 24 (FIG. 5). The pins 54 provide radial support for the deck assembly 24 and hold the deck assembly in position for removal. A perspective view of the removed deck assembly 24 provides a view of the deck segment guides 116 and 117 and the drum expansion segment 114. The arcuate or straight segments 22 have the deck segment locking pin 115 engaged by the pin 54. A spring 129 is used in the contracted position when the pin 54 is inserted (FIG. 6). Once the pin 54 is removed, the spring 129 is free to release and allow the locking pin 115 to extend radially inwardly to accomplish the locking of the mechanism.

Figure 7:
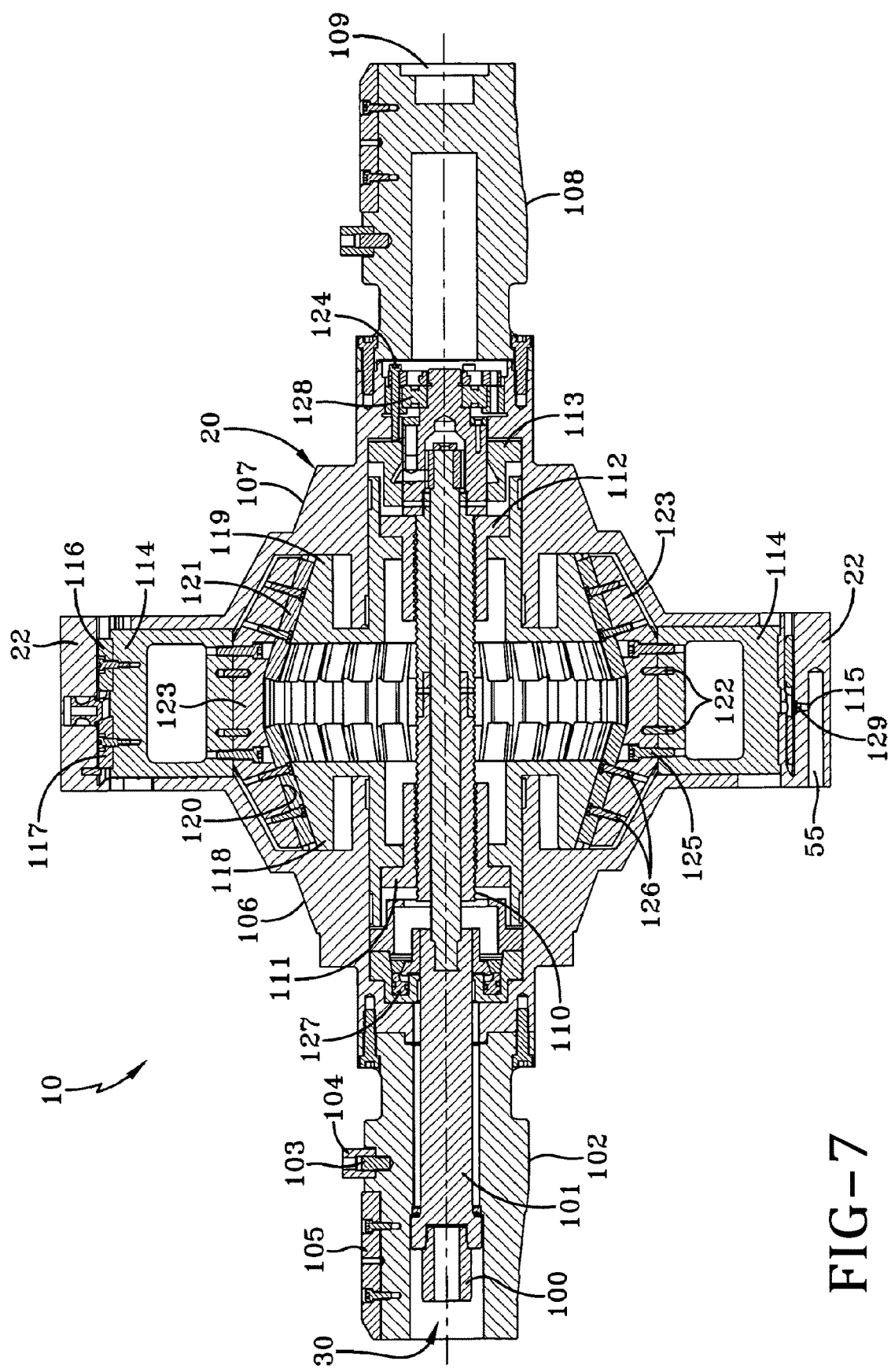
FIG. 7 is a cross-sectional view of the tread or tread belt assembly building drum attached to the drive means for rotating the drum and illustrating the means for radially expanding and contracting the support means as well as an overload clutch means.

In order for the tread belt building drum 10 to expand radially and contract radially and to provide a surface 24 upon which a tread belt assembly can be built, the building drum 10 may accept a drive means 30 that provides rotational movement of the entire building drum assembly 10 (FIG. 7). The drive means 30 is connected to a motor (not illustrated) which can provide rotational movement of the tire building drum assembly 10. The drive means 30 includes a drive spline 100 which is connected to a screw drive shaft 101 and embedded inside a drum quick-mount mounting cone 102. The quick-mount mounting cone 102 provides for rapid engagement and disengagement of the drum assembly 10. The drum quick-mount mounting cone 102 has a key 104 with a key locating pin 103 and a longitudinally extending keyway 105. A drum inboard housing 106 has a corresponding drum outboard housing 107 (FIG. 7). An outboard support cone 108 may be disposed on the opposite side of the drive means 20 and the drum assembly 10.

The outboard support cone 108 may have a live center receptacle 109. The live center may permit easy rotation of the drum assembly 10 while the entire assembly is being rotated, as well as both longitudinal and lateral movement. Viewed internally at the center of the mechanism or apparatus 10, there may be a ball screw or acme threaded screw assembly 110. The threaded assembly 110 may be comprised of two components, one having left-hand threads and an opposite side having right-hand threads. These two components may be pinned together to provide simultaneous rotation of the mechanism. On the left-hand side may be an inboard ball nut or acme nut 111 connected to one end of the threaded screw 110 and on the opposite or outboard side another ball nut or acme nut 112. A ball screw overload protection clutch mechanism 113 may provide capability of disengaging the shaft 110 and permitting the drum assembly 10 to collapse, if the pressure is exceeded beyond the capability of the clutch mechanism. This override clutch protection mechanism 113 ensures that, when the mold closes or pressure is applied to the radially outer surface of the deck 24, the deck 24 may collapse as the clutch mechanism 113 disengages, permitting the entire unit or drum 10 to collapse slightly thereby preventing overload from damaging the internal workings of either the mold or the assembly 10.

Radially inward of the deck 24 or its arcuate or straight segments 22 may be a drum expansion segment 114. The drum expansion segments 114 are threadedly engaged by threaded fasteners 125 to an expanding segment base 123. The drum expansion segments 114 are also located by pins 122. Radially inward of the expanding segment base 114 is an outward outboard segment cone bushing 121 and an inboard segment cone bushing 120 which are threadedly attached using screws or threaded fasteners 126 to the expanding segment base 123. Radially inward of the inboard segment bushing 120 is the inboard expansion cone 118. Similarly, on the outboard side the outboard segment cone bushing 121 is an outboard expansion cone 119. The bushings 120, 121 are designed to slide along the cone surfaces of the inboard expansion cone 118 and outboard expansion cone 119, respectively. The building drum 10 may be in an expanded position such that the radially outer deck or building surface 24 is radially expanded. As the drive shaft 101 is spun or rotated inside the bearings 127, 128, the inboard ball nut 111 and outboard ball nut 112 push the expansion cones both inboard and outboard 118, 119, respectively, radially to the center plane of the building drum 10. As these cones 118, 119 push to the center plane, the conical surface permits the expanding segment base 123 and its bushings 120, 121 to slide along the conical surfaces and contract radially inwardly.

Figure 8A:
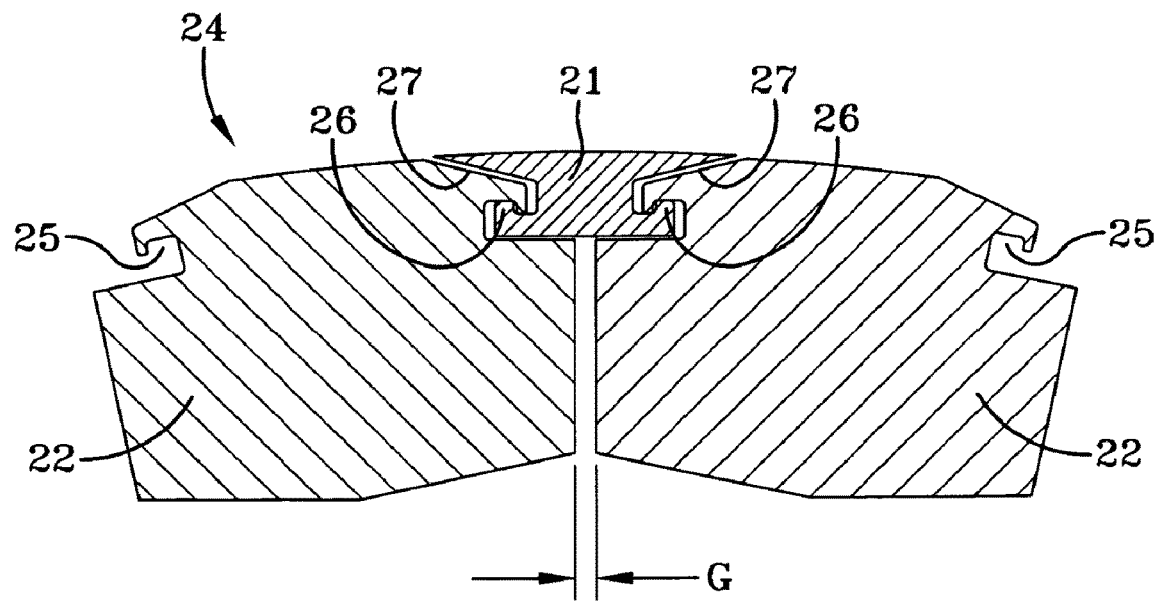
FIG. 8A is a cross-sectional view of the adjacent arcuate or straight segments with a gap spanner shown in the expanded fully open position.
Figure 8B:
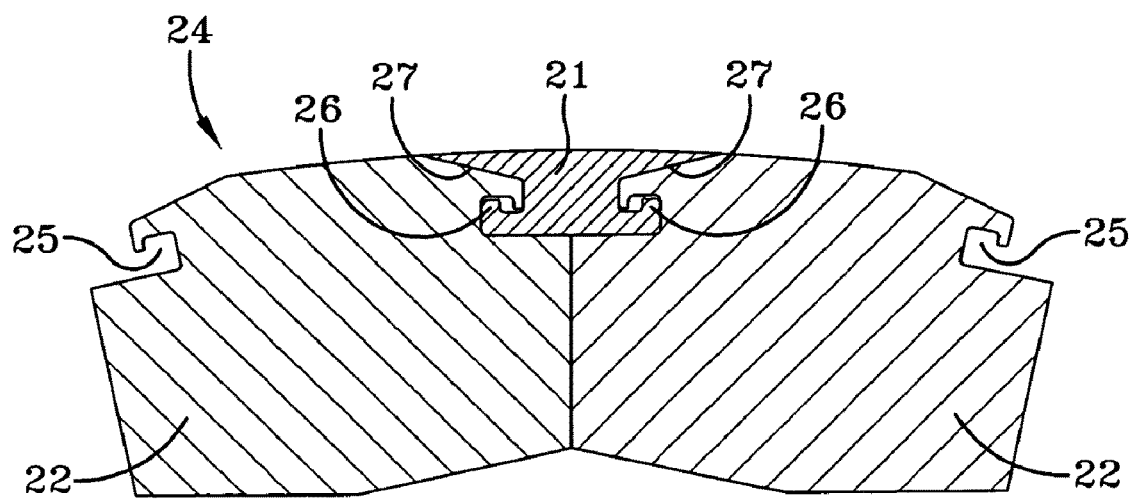
FIG. 8B is the same features illustrated in FIG. 8A but in the fully collapsed contracted position.

In the fully expanded position, the arcuate or straight segments 22 are shown with a gap G between each segment in the fully radially expanded position (FIG. 8A). The gap G may be at least 0.050 in (1.25 mm) as measured between the adjacent segments. The gap spanning segment 21 is constrained in channels 25. Each gap spanning segment 21 has lobes 26 that are captured within these channels 25. They may be slid laterally to remove the segments 21, 22, but are constrained such that the arcuate or straight segments 22 can move circumferentially a certain extent until they engage the lobes 26. This permits a diametrical expansion of the assembly 10 by a few millimeters. The ends of the segments 22 have a chamfered surface 27 which provides a space for the gap spanning segment 21 to occupy at the correct diameter for tread belt building. Upon contraction, the arcuate or straight segments close upon each other and the gap spanning segments 21 are moved within the channels 25 such that the lobes 26 contact the interior surface of the arcuate or straight segments 22 (FIG. 8B). When this occurs the gap G between the adjacent arcuate or straight segments 22 is closed, permitting each of the segments to contract radially inward. This feature enables one to build a tread or tread belt assembly in such a manner that the tread or tread belt assembly can easily be removed once assembled to the deck assembly 24.

Figure 9:
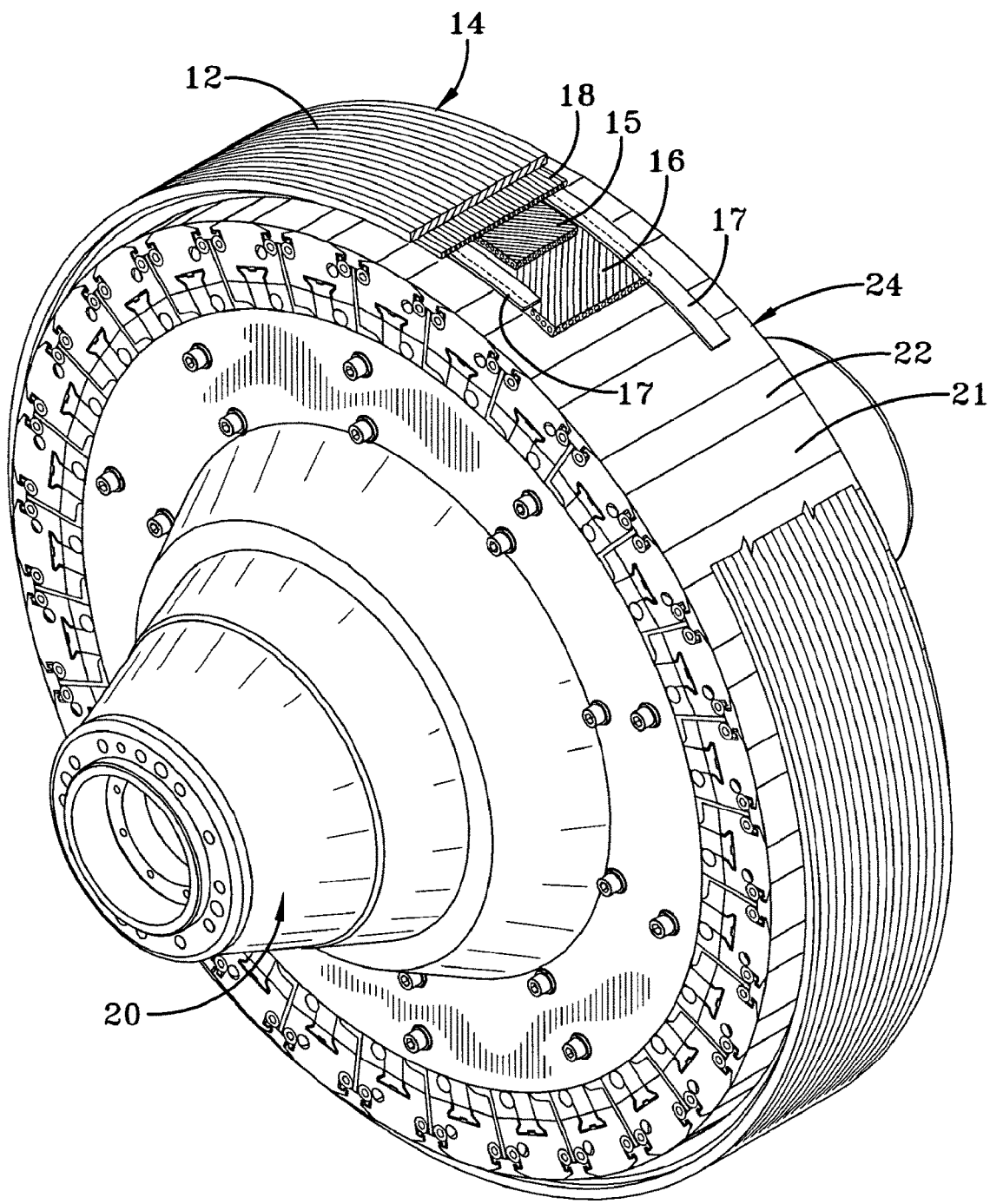
FIG. 9 is a perspective view of the building drum assembly showing a tread belt assembly as applied to the support surface.

The tread drum assembly 10 is shown wherein a typical tread belt reinforcing structure 14 is shown assembled to the exterior surface or peripheral surface of the deck 24 (FIG. 9). A first belt layer 16 lays adjacent to the surface 24. Two belt edge elastomeric strips 17 are located at the lateral edges of the first belt layer 16. Interposed between the elastomeric strips 17 is a second belt layer 15 having cords oriented oppositely relative to the first belt layer 16. An overlay 18 may be a circumferentially extended cord reinforced structure that "overlays" both the second belt layer 15, the first belt layer 16, and the underlying gum strips 17. Radially outward of the overlay 18 may be an unvulcanized layer 12 of tread rubber. The tread rubber 12 may be provided as strips of rubber wound and laid adjacently or may be provided as a single layer.

Figure 10:
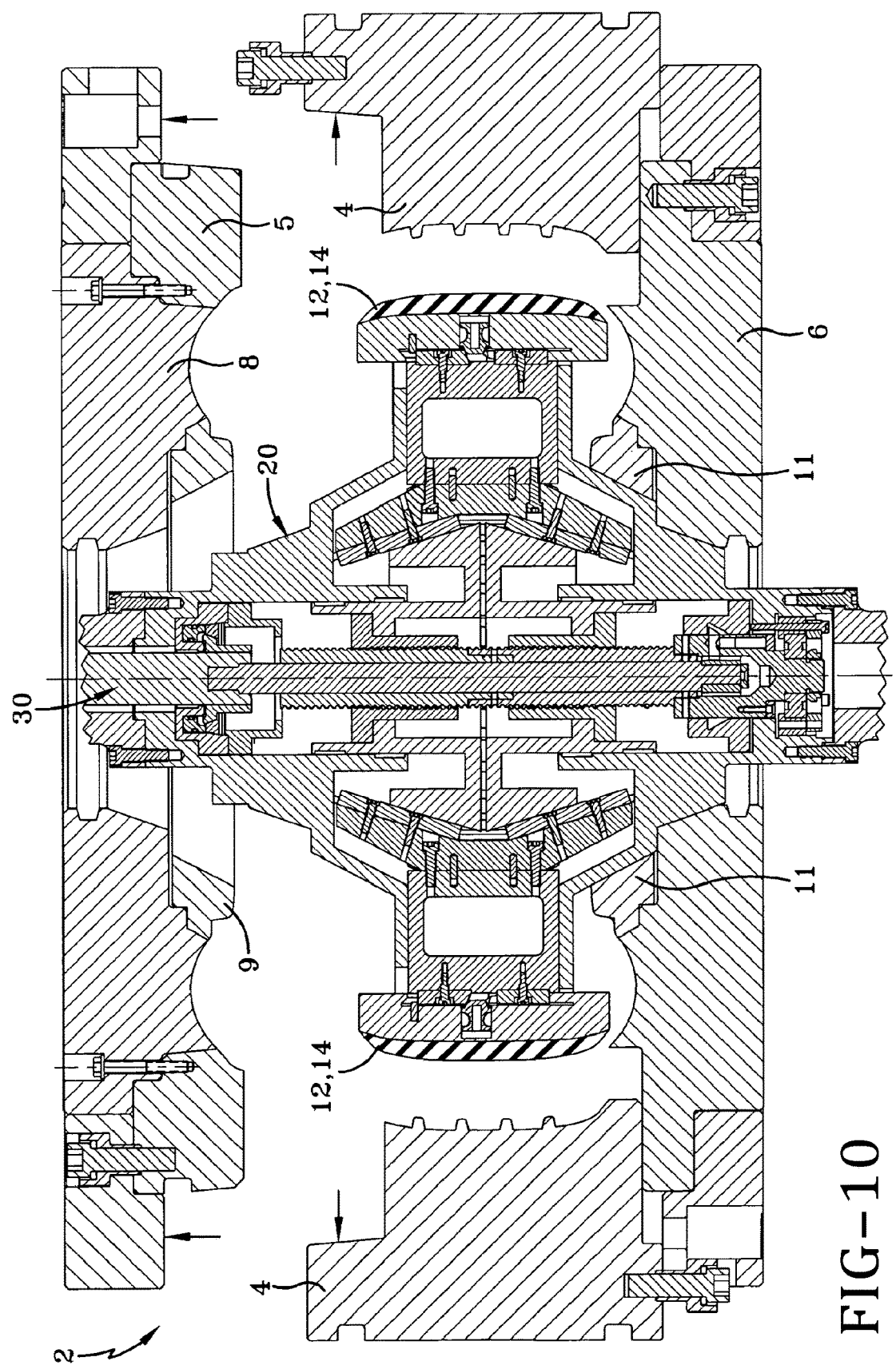
FIG. 10 is a cross-sectional view of the tread or tread belt assembly mounted on the building drum and being placed into an opened mold.
Figure 11A:
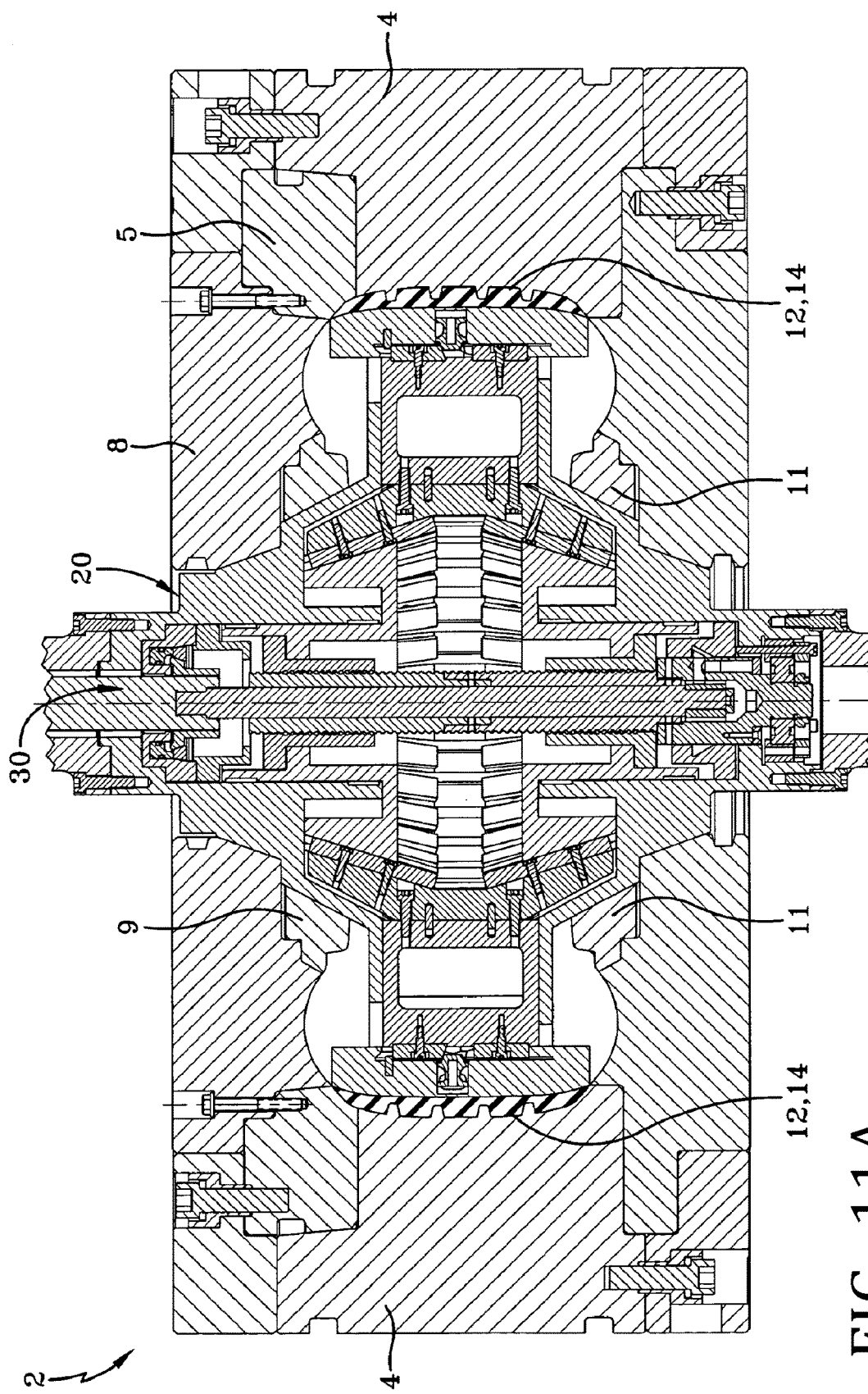
FIG. 11A is a cross-sectional view of the tread or tread belt assembly mounted on the building drum with the mold being closed onto the assembly.
Figure 11B:
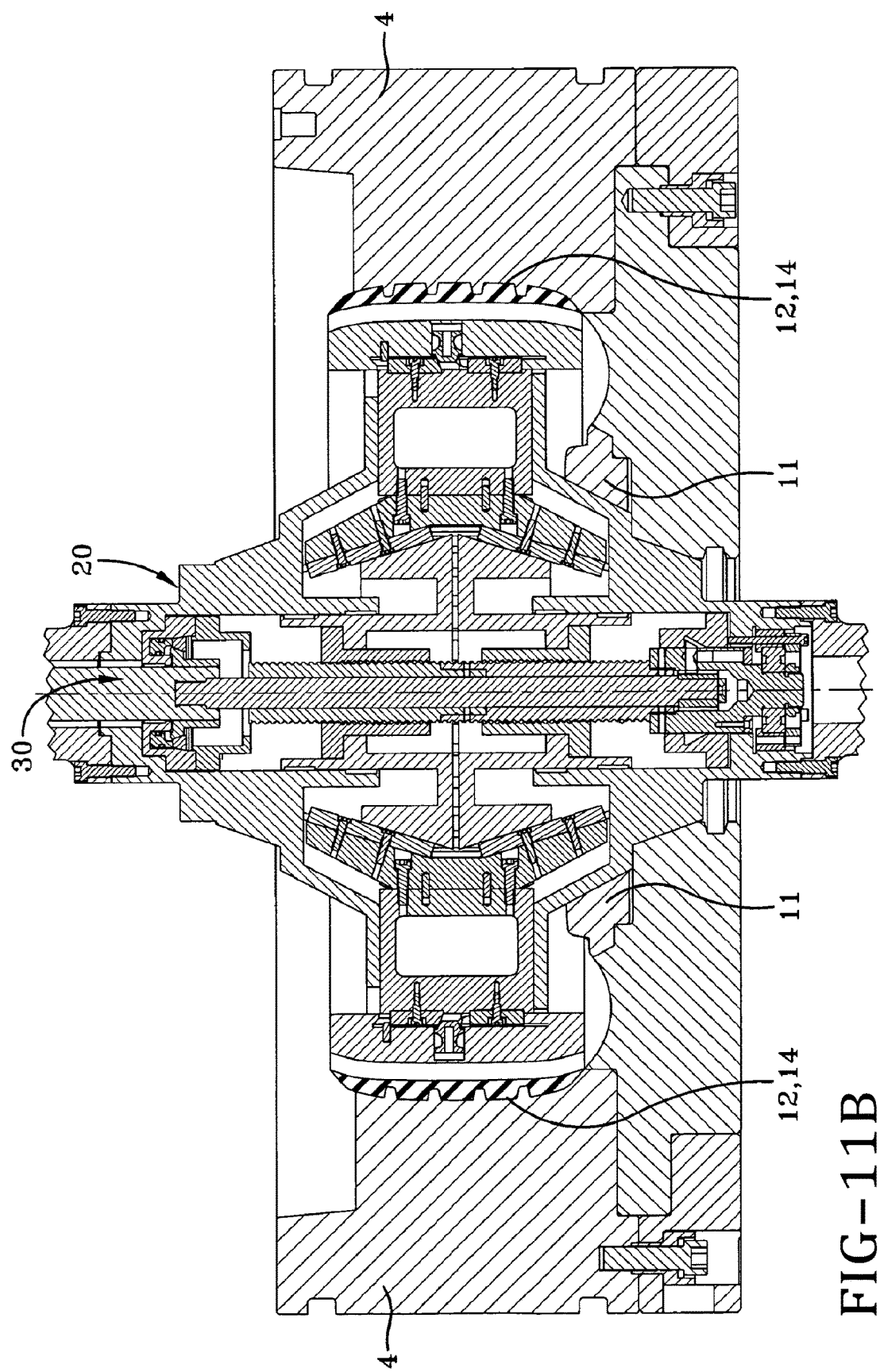
FIG. 11B is a cross-sectional view of the tread belt assembly in the mold with the building drum collapsed and being removed from the mold.

Once the tread belt assembly 14 is applied onto the building surface 24, the entire building drum assembly 10 may be placed inside a curing mold 2 (FIG. 10). The tread assembly 14 may be mounted on a building drum 10 that is in a radially expanded position and placed inside the open and expanded curing mold 2. The curing mold 2 has tread forming segments 4 on each side, a bottom plate 6, a pair of bead forming rings 11, 9, a top plate 8, and a tread forming segment 5 attached to the top plate. Once inserted inside the mold 2, the mold maybe closed and the mold segments contract against the tread belt assembly on the tread belt drum assembly 10 (FIG. 11A).

The tread rubber 12 may then be forced into the tread forming grooves of the segments 4. Once fully contracted, the tread rubber 12 may adhere to the tread forming segments 4. It may be preferred that the tread rubber 12 be warmed or applied to the building drum 10 hot, such that when the mold is closed, the rubber may be relatively softened so that it will easily accept, adapt, and conform to the tread forming segments 4. The tread 12 may be warmed to a temperature of approximately 110° C. or between 90° C. and 110° C. Once pressure is applied, assuming the pressure does not exceed the desired limits, the entire tread belt assembly 14 may be adequately adhered to the internal surfaces of the tread forming segments 4.

Figure 12:
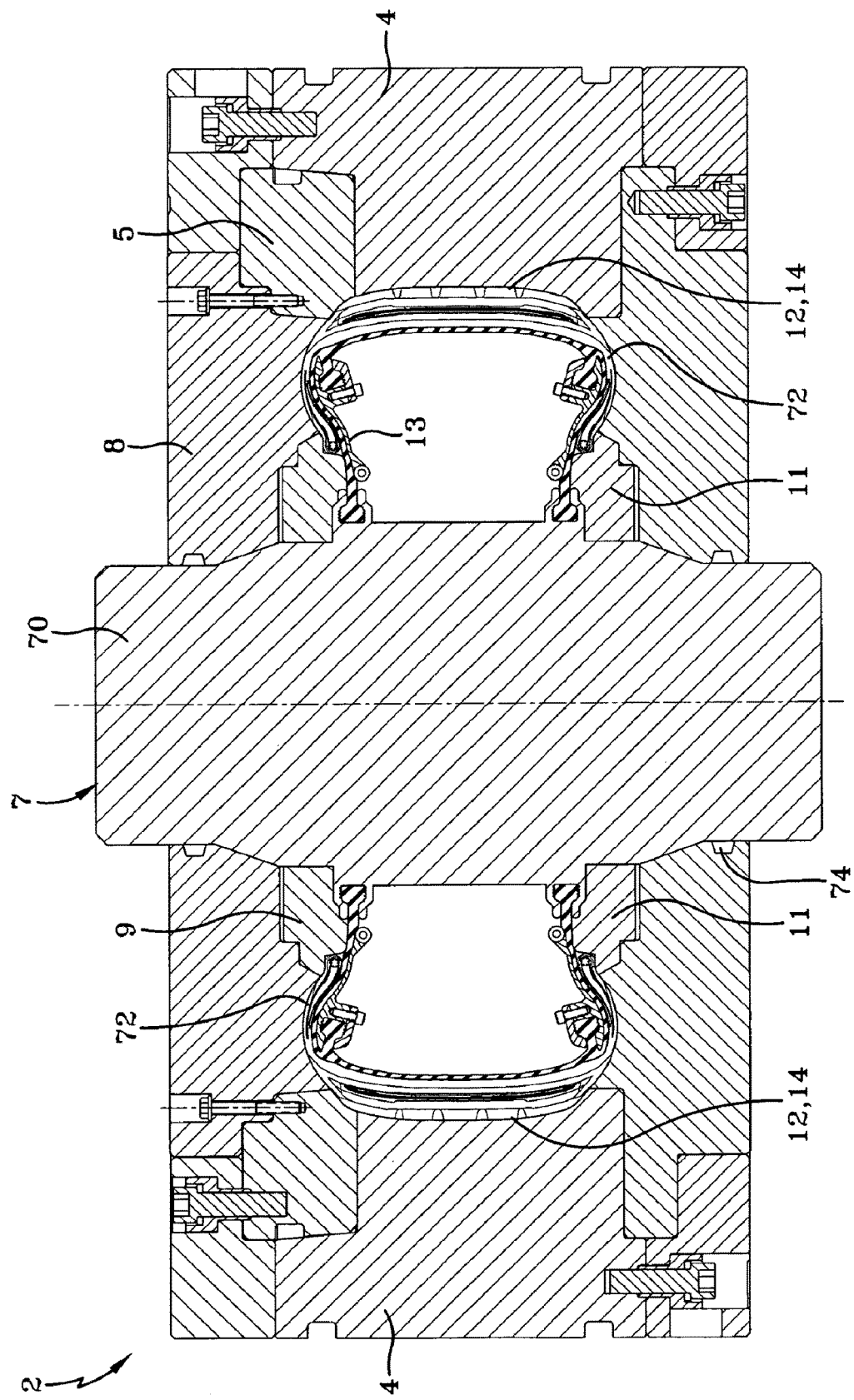
FIG. 12 is a cross-sectional view of the mold and tread or tread belt assembly being cured to a carcass assembly mounted on a collapsible building drum assembly.

While the mold 2 is still closed, it may be desirable to contract the tread belt drum assembly 10 into a radially contracted position. The tread belt 14 will remain in the tread forming segments 4. Once fully retracted, the drum assembly 10 is freed from the tread belt assembly 14 and the top plate 8 of the mold 2 may be removed along with the associated connected components (FIG. 10). Once the mold top plate 8 is removed, the tread drum assembly 10 can be removed from the mold 2. Once removed, the tread belt 14 is left in the mold 2 with the segments 4 closed and a tire building drum assembly 7 with a green carcass 72 already mounted to it may be placed into the mold 2. The carcass building drum assembly 7 has an axle 70 that is contoured and locked into the mold using locking detents 74 (FIG. 12). Once closed, a gaseous fluid or steam is introduced into the interior through the axle 70 and the internal pressure is applied to the carcass adhering it to the tread belt assembly at the interfacial surfaces. The tire is then cured in this self-locking mold 2.

When a mold 2 is first closed and the tread building drum assembly 10 is inside the mold, should the mold be misaligned or the tread rubber 12 not properly aligned for closing the segments 4, then the clutch mechanism 113 may disengage, allowing the entire assembly 10 to collapse and preventing damage to the mold 2. The tread belt assembly 14 may be made on the building drum 10 and the transportability of the building drum 10 may permit the entire assembly to be placed inside a mold 2 whereby the tread belt assembly can be transferred directly to the mold prior to being applied to the carcass 72. Then, the tread building drum assembly 10 may be collapsed and removed from the mold 2 and the entire green carcass 72 on a building drum assembly 7 can be inserted into the mold, locked into position, pressurized, and cured to form a finished tire.

The tread 12 or tread belt assembly 14 may also be applied to the deck 24 when the deck is set at an outside diameter less than the diameter required to fit precisely in the closed mold position. A small amount of at least 0.5 mm less than the desired finish diameter of the tread belt 14 may be selected. Once the tread 12 or tread belt assembly 14 is placed in the open mold 2, and after the mold 2 is closed and the mold segments 4 embed into the tread rubber 12, then the drive means 30 may be can rotated, expanding the building drum 10 from the slightly smaller build diameter to the required mold diameter. This additional expansion firmly compresses the tread 12 or tread belt assembly 14 into the tread forming segments 4 and insures a slight tensioning of the tread or tread belt assembly into the tread forming segments. Then, the deck 24 can be retracted releasing it from the tread 12 or tread belt assembly 14 as previously discussed.

In accordance with the present invention, the live center receptacle 109 may receive a live center pin 201 for preventing unwanted flexion of the tire building drum assembly 10. The live center pin 201 may have two potential movements, longitudinal and transverse. Both longitudinal and transverse movements may be driven by a single actuator 203. Conventional systems typically require an actuator for each direction (e.g., two, three, etc.). Utilization of a single actuator 203 may simplify the assembly and reduce cycle time.

Figure 13:
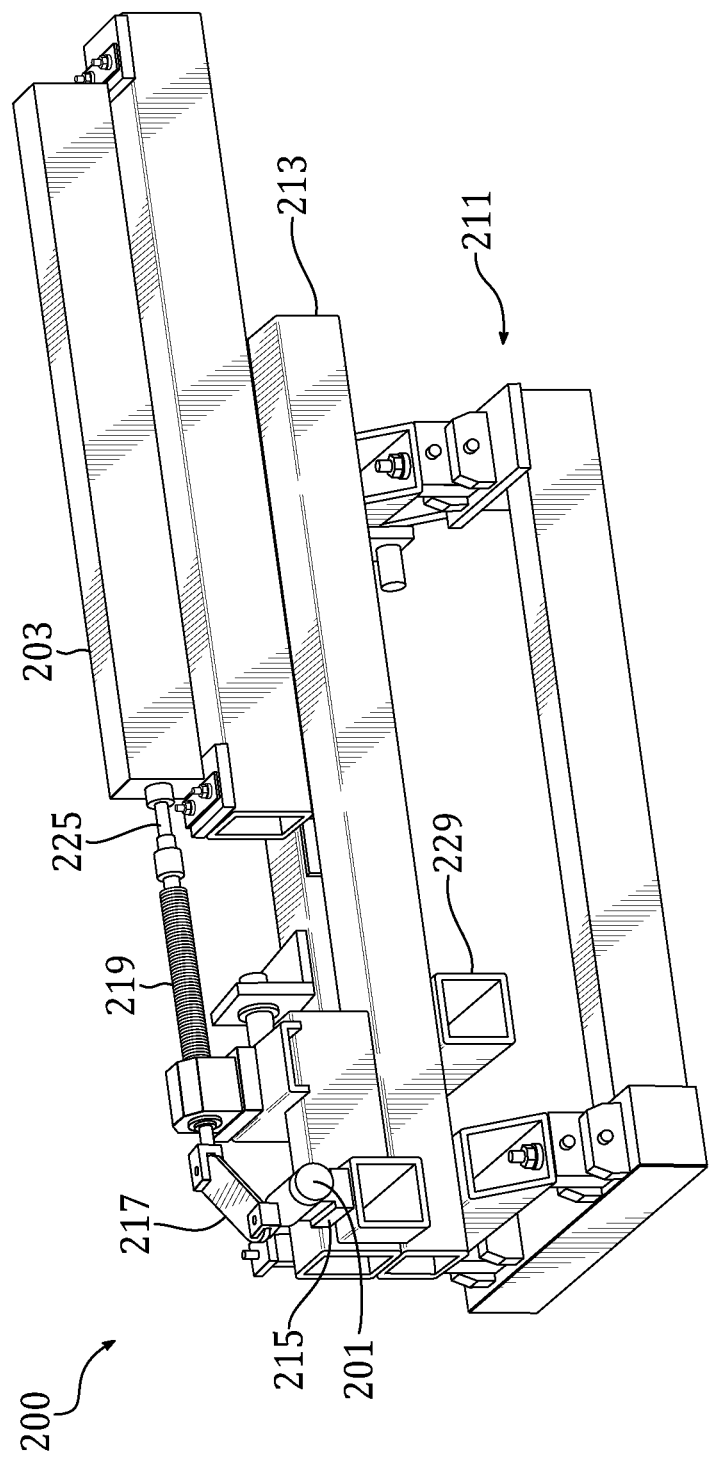
FIG. 13 schematically represents an apparatus in accordance with the present invention under a first condition.

A system 200 (e.g., apparatus, method, assembly, etc.) in accordance with the present invention may include a support frame 211, a longitudinal rail 213 slidingly mounted on the support frame, a transverse rail 215 slidingly secured to the longitudinal rail, and a single actuator 203 for moving the longitudinal rail in a longitudinal direction and a transverse direction (FIG. 13). The system 200 may further include a link 217 pivotally secured about vertical axes to the actuator 203 and the transverse rail 215. The actuator 203 may include a cylinder associated with an actuation rod 225. The actuator 203 may be secured to the support frame 211 such that, when the cylinder acts on the rod 225, the longitudinal rail 213 moves in the longitudinal direction. The link 217 may be pivotally secured to an end of the actuation rod 225.

Figure 14:
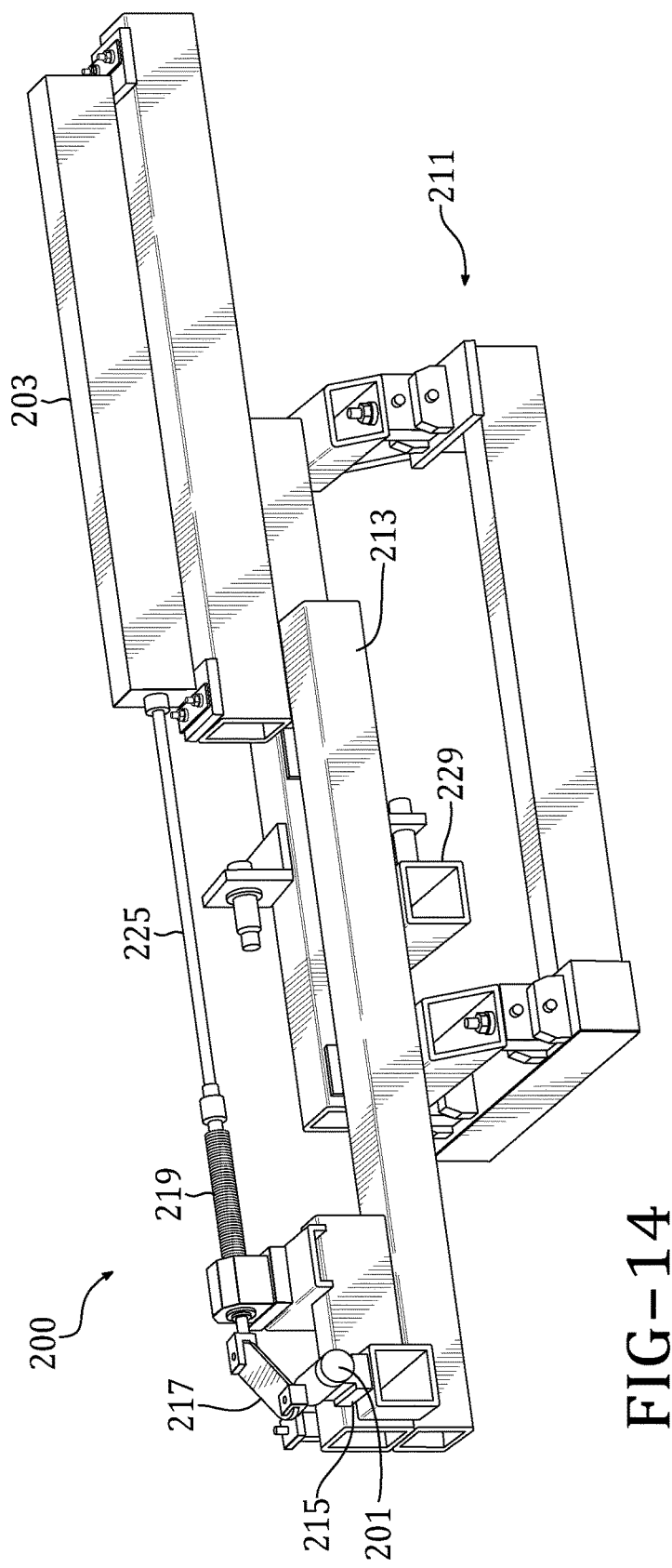
FIG. 14 schematically represents an apparatus in accordance with the present invention under a second condition.

The system 200 may have a first movement and a second movement. The first movement may begin with the system 200 in a first condition shown in FIG. 13 and terminate with the system in a second condition shown in FIG. 14. The live center pin 201 has moved in the longitudinal direction to the second position determined by a longitudinal stop 229. A spring 219 is positioned about the actuation rod 225 such that the stiffness of the spring is greater than the force of friction encountered by the actuator 203 in moving the longitudinal rail 213 to the second position (FIG. 14).

Figure 15:
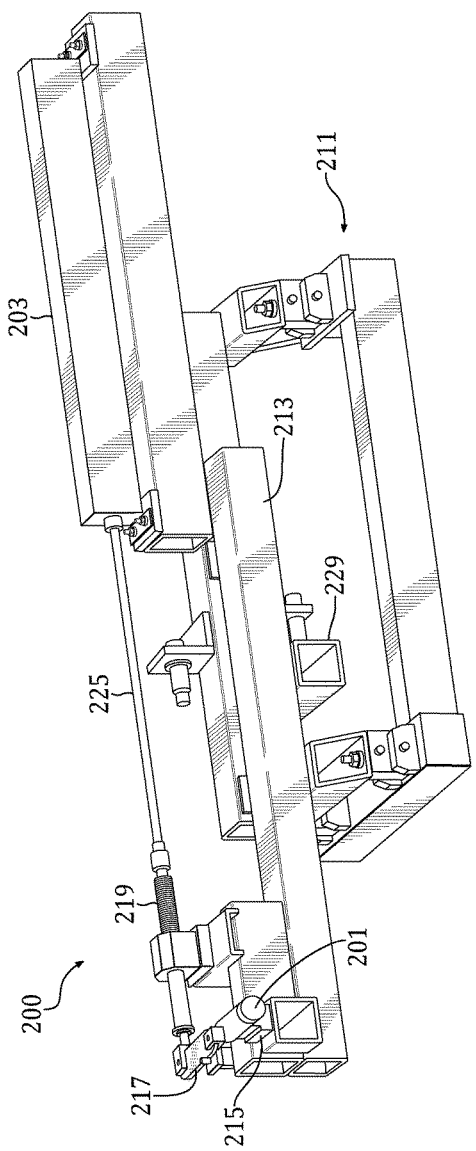
FIG. 15 schematically represents an apparatus in accordance with the present invention under a third condition.

At the second position, the actuation rod 225 may still continue to exert a force on the longitudinal rail 213. Thus, because of the longitudinal stop 229, the actuation rod 225 may begin to compress the spring 219 thereby initiating the second movement from the second condition (FIG. 14) to a third condition (FIG. 15). The actuation rod 225 acts on the link 217. The orientation (e.g., 45 degrees to both longitudinal and transverse directions) and pivotal mounting cause the link 217 to transfer the longitudinal force of the actuation rod 225 to a transverse force acting on the transverse rail 215 and the live center pin 201. The live center pin 201 thus reaches the third condition (FIG. 15), having moved sequentially longitudinally, and then transversely.

The previous descriptive language is of the best presently contemplated mode or modes of carrying out the present invention. This description is made for the purpose of illustrating an example of general principles of the present invention and should not be interpreted as limiting the present invention. The scope of the present invention is best determined by reference to the appended claims. The reference numerals as depicted in the schematic drawings are the same as those referred to in the specification. For purposes of this application, the various examples illustrated in the figures each use a same reference numeral for similar components. The example structures may employ similar components with variations in location or quantity thereby giving rise to alternative constructions in accordance with the present invention.

What is claimed is:

1. An assembly for moving an end portion of a tire building assembly comprising:
    a support frame for supporting the end portion; a longitudinal rail slidingly mounted to the support frame; a transverse rail slidingly mounted to the longitudinal rail; and an actuator for moving the longitudinal rail in a first direction relative to the support frame, the actuator also moving the transverse rail in a second direction relative to the support frame and the longitudinal rail.

2. The assembly as set forth in claim 1 wherein the first direction extends ninety degrees relative to the second direction.

3. The assembly as set forth in claim 1 further including a link pivotally secured to both the longitudinal rail and the transverse rail.

4. The assembly as set forth in claim 1 wherein the actuator includes a cylinder, an actuating rod, and a spring acting against movement in the first direction.

5. The assembly as set forth in claim 1 further including a link for transferring a longitudinal force of the actuator into a transverse force acting at ninety degrees relative to the longitudinal force.

6. The assembly as set forth in claim 1 further including a stop for limiting movement of the longitudinal rail in the first direction.

7. The assembly as set forth in claim 1 further including a first movement and a second movement acting subsequently to the first movement, the first movement producing motion in the first direction and the second movement producing motion in the second direction.

8. The assembly as set forth in claim 1 further including a first position of a live center pin, a second position of the live center pin a first distance from the first position in the first direction, and a third position of the live center pin a second distance from the second position in the second direction.

9. The assembly as set forth in claim 1 further including a link pivotally secured about vertical axes to the actuator and the transverse rail.

10. The assembly as set forth in claim 1 further including a link proving sequentially movement of the end portion in the first direction and then the second direction.

* * * * *